United States Patent Office 3,139,807
Patented July 7, 1964

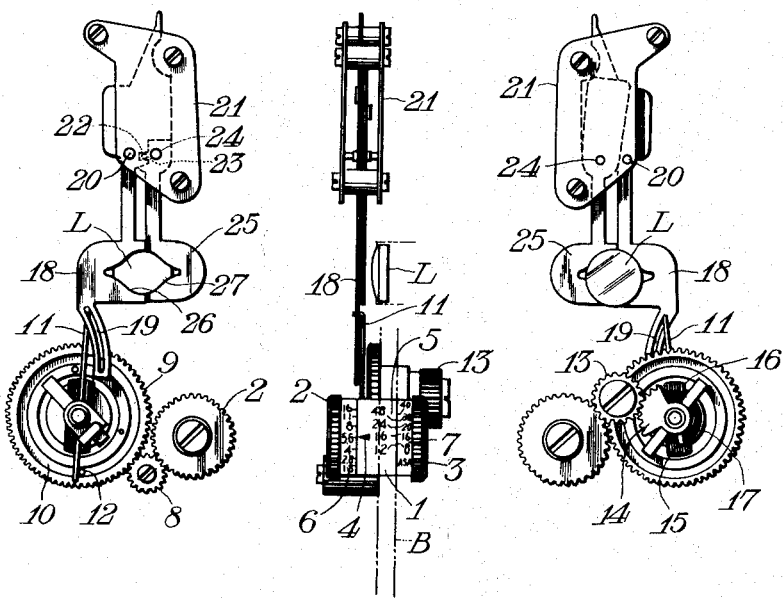

3,139,807
EXPOSURE AND SENSITIVITY CONTROL
APPARATUS
Yoshinobu Sakaki, 5 Kikusakacho 1-chome, Chigusa-ku, and Haruo Teshi, 16 Tokugawayama 2-chome, Chigusa-ku, both of Nagoya, Japan
Filed Sept. 20, 1961, Ser. No. 139,389
Claims priority, application Japan Sept. 29, 1960
3 Claims. (Cl. 95—64)

This invention relates generally to automatic exposure meters and particularly to aperture regulation for a photographic or cinematographic camera in which diaphragm blades are adapted to be opened and closed by an electric current meter connected to a photocell.

It is an object of the invention to provide a device for automatic regulation of lens-opening for a photographic or cinematographic camera by operatively connecting the device to an exposure meter to both a ring for regulating a stop setting the maximum lens-opening and a ring for compensating for a sensitivity of a photosensitive surface or film.

It is another object of the invention to provide a device for automatic regulation for a photographic or cinematographic camera capable of automatically setting the optimum diaphragm aperture or lens-opening for a given sensitivity of the photosensitive surface used for taking exposures.

With the objects in view, the present invention resides in a device for automatic regulation for a photographic or cinematographic camera comprising diaphragm means including a plurality of diaphragm blades adapted to be controlled by an electric current exposure meter connected to a photocell. An aperture control device comprises regulating means provided to limit the lens-opening and means for compensating for sensitivity of a photosensitive film. The aperture control device has a movable stop member operatively connected to said stop regulating means to restrict movement of a member, for example a pointer provided on the electric current exposure meter in a direction in which the diaphragm blades are moved or actuated to form a larger diaphragm aperture. The device cooperates with a hair spring member of the exposure meter and having one end connected to motor means comprising a moving coil provided on the electric exposure meter and the other end adapted to be displaced in accordance with movement of means for compensating for sensitivity of a photosensitive member or surface on which an exposure is to be made.

The invention will be more readily apparent from the following detailed description taken in conjunction with the accompanying drawings in which:

FIG. 1 is a front elevation view of a device for automatic stop regulation constructed in accordance with the teachings of the invention;

FIG. 2 is a side elevational view of the device illustrated in FIG. 1; and

FIG. 3 is a rear elevation view of the device illustrated in FIG. 1.

Referring now to the drawings, there is illustrated one form of the invention. A camera housing illustrated by dotted-and-dashed line B includes suitably secured thereto a ring supporting member 1 for rotatably supporting at opposite ends a ring 2 for regulating a stop as later explained and a ring 3 for compensating for the sensitivity of a photosensitive film used respectively. The supporting member 1 includes a reference mark 4 for reading the exposure numbers such as $f1.8$, $f2.8$, $f4$, $f5.6$, $f8$, $f11$, and $f16$, on the periphery of the regulating ring 2 and a scale 5 comprising the figures indicating the picture frame feed per second (such as 12, 16, 24 and 48) disposed oppositely to a sensitivity or ASA scale 7 on the periphery of the compensating ring 3. By rotating the compensating ring 3, the ASA number of the film used may be brought into register with the desired film feed number of the scale 5.

The regulating ring 2 is provided on its periphery with a gear coupled through an intermediate gear 8 to a linking gear 9 which, in turn is rotatably disposed about an electric current exposure meter 10 and which comprises a limit or stops stopper 12 for defining a position of a pointer 11 in the meter up to which it can be returned. On the other hand, the compensating ring 3 is coupled through another intermediate gear 13 to a gear sector 14 disposed rotatably in concentric relationship to the exposure meter 10. The gear sector 14 is provided with a member 15 for carrying one end of a coiled hair spring 17 having the other end connected to a moving coil 16 provided on the exposure meter 10. This spring tends to decrease the lever opening.

As shown in FIG. 2, the pointer 11 of the meter 10 has its end portion bent in the form of hook and slidably engages a curved slot 19 with a suitable curvature formed on an extension of one blade 18 of a pair of diaphragm blades for controlling an amount of light incident upon a photosensitive film or surface (not shown) as will be described hereinafter. This diaphragm blade 18 is rotatably supported on a frame member 21 at a pivot 20 in such a manner that those portions of the blade extending in the opposite directions from the pivot will be substantially in a balanced condition. Further the diaphragm blade 18 is provided adjacent the pivot 20 with a slot or notch 22 which engages a pin 23 formed on the other diaphragm blade 25 which is supported on the supporting frame 21 on a pivot 24 whereby the pair of diaphragm blades 18 and 25 can effect relative movement with respect to each other to vary a diaphragm aperture defined by opposed notches 26 and 27 formed on the blades respectively and hence the amount of light passing through the aperture to a photosensitive film or surface (not shown). It will be understood that a photocell (not shown) is provided in the housing B and electrically connected to the electric current exposure meter 10.

The operation of the device thus far described is as follows:

With an amount of light incident upon the photocell, an electric current proportional to the light will flow through a circuit comprising the electric exposure meter 10. Therefore, the pointer 11 will be turned clockwise as viewed in FIG. 1 and in dependence upon said amount of light incident upon the photocell.

The compensating ring 3 is previously rotated according to the desired film feed rate, for example number of frames per second, corresponding to a sensitivity factor of a photosensitive film used to thereby tension the coiled hair spring. Thus, the pointer 11 is properly displaced or tensioned different to tensions corresponding to the the sensitivity factors of the photosensitive films used. As a result, the diaphragm blades 18 and 25 will define a diaphragm aperture therebetween capable of subjecting the film to the proper exposure. It will be understood that any variation in the amount of light incident upon the photocell results in an automatic change of the diaphragm aperture by the action of the pointer 11 on the moving coil 16.

On the other hand by manually rotating the regulating ring 2 with respect to the reference mark 4, the stop 12 is brought into an angular position corresponding to that figure on the stop scale 6 opposed to the reference mark. Therefore, the pointer 11 is stopped by the stop thus displaced and can move the diaphragm blades 18 and 25 within a range having the diaphragm aperture corresponding to the abovementioned figure on the stop scale as its upper limit.

From the foregoing it will be recognized that the objects of the invention have been accomplished by the provision of a device for automatic stop regulation comprising, in combination, a movable stop member operatively connected to a stop regulating ring to restrict movement of the diaphragm blades by restricting angularly the angular rotation of the coil in an aperture-closing direction and the hair spring which has one end connected to the moving coil provided on an exposure meter and the other end adapted to be displaced in accordance with movement of the means for compensating for the sensitivity of a photosensitive surface or film used in operation. Thus the motor or coil reaches a condition of equilibrium in its angular travel or rotation compensating automatically for said sensitivity.

While the invention has been described in conjunction with a preferred embodiment thereof, it is to be understood that various changes and modification may be made without departing from the spirit and scope of the invention. For example, the sensitivity scale 7 may be stationary while the film speed scale 5 be movable, because both the scales are only required to be movable with respect to each other. In this case, the hair spring is operatively connected to exposure-time scale.

What we claim is:

1. In a camera having a plurality of actuatable diaphragm blades operable relatively to define an exposure aperture for taking exposures on a photosensitive surface in said camera in operation, an automatic exposure meter energized by light of a scene to be photographed onto said photosensitive surface comprising a coil movable automatically angularly in a direction corresponding to an aperture-closing direction as a function of the light available from said scene, means operably connecting said coil and said blades for actuating them relatively for automatically variably defining the size of said exposure aperture as a function of the angular rotation of said coil, a coil spring operably connected to said coil in opposition to rotation in said aperture-closing direction and urging said coil in an opposite direction, corresponding to a direction for operating said blades for enlarging said aperture, the improvement which comprises an aperture control device comprising a first ring operable selectively manually to variably set the maximum angular position to which said spring will rotate said coil and thereby set the maximum opening of said aperture, means operable manually to variably adjust the tension of said spring to different tensions corresponding to sensitivity factors of different photosensitive surfaces used in said camera in operation thereby compensating for the sensitivity of said photosensitive surface, whereby conditions of equilibrium are reached by said coil in angular rotation thereof compensating for said sensitivity.

2. In a camera having a pair of actuatable diaphragm blades operable relatively to define an exposure aperture for taking exposures on a photosensitive surface in said camera in operation, an automatic exposure meter energized by light of a scene to be photographed onto said photosensitive surface comprising motor means movable automatically angularly in a direction corresponding to an aperture-closing direction as a function of the light available from said scene, means operably connecting said motor means and said blades for actuating them relatively for automatically variably defining the size of said exposure aperture as a function of the angular rotation of said motor means, a spring operably connected to said motor means in opposition to rotation in said aperture-closing direction and urging said motor means in an opposite direction corresponding to a direction for operating said blades for enlarging said aperture, the improvement which comprises an aperture control device comprising means operable manually to selectively variably set the maximum angular position to which said spring will rotate said motor means in said opposite direction and thereby setting the maximum opening of said aperture, means operable manually, selectively to variably adjust the tension of said spring to different tensions corresponding to different sensitivity factors for different photosensitive surfaces used in said camera in operation and thereby compensating for the sensitivity of said photosensitive surface, whereby conditions of equilibrium are reached by said motor means in angular rotation thereof compensating for said sensitivity.

3. In a camera according to claim 2, in which said motor means comprises a coil, said means to variably set the maximum angular position to which said coil is rotated comprises, a member angularly rotated in conjunction with said coil, a stop positionable selectively at different angular positions corresponding to desired maximum aperture opening settings and disposed to engage said angularly rotated member when said coil is being rotated in said aperture-opening direction, and said means to adjust said spring to different tensions comprising an angularly rotated ring positionable in operation to positions corresponding to said sensitivity factors.

References Cited in the file of this patent

UNITED STATES PATENTS

| | | |
|---|---|---|
| 2,974,578 | Wittel | Mar. 14, 1961 |
| 2,991,704 | Pickens | July 11, 1961 |
| 2,995,996 | Gossen | Aug. 15, 1961 |
| 3,005,390 | Hahn | Oct. 24, 1961 |